(12) United States Patent
Moore et al.

(10) Patent No.: US 7,725,306 B2
(45) Date of Patent: May 25, 2010

(54) EFFICIENT PHRASE PAIR EXTRACTION FROM BILINGUAL WORD ALIGNMENTS

(75) Inventors: Robert C. Moore, Mercer Island, WA (US); Christopher B. Quirk, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1001 days.

(21) Appl. No.: 11/477,978

(22) Filed: Jun. 28, 2006

(65) Prior Publication Data

US 2008/0004863 A1 Jan. 3, 2008

(51) Int. Cl.
  *G06F 17/20* (2006.01)
  *G06F 17/28* (2006.01)
(52) U.S. Cl. .................. 704/4; 704/5; 704/7; 704/8
(58) Field of Classification Search ............... 704/1–10
  See application file for complete search history.

(56) References Cited

U.S. PATENT DOCUMENTS

| | | | | |
|---|---|---|---|---|
| 5,442,546 | A | 8/1995 | Kaji et al. ............. | 364/419.08 |
| 5,991,710 | A | 11/1999 | Papineni et al. ............. | 704/2 |
| 6,161,083 | A | 12/2000 | Franz et al. ............. | 704/4 |
| 6,289,302 | B1 | 9/2001 | Kuo ............. | 704/2 |
| 6,473,729 | B1 | 10/2002 | Gastaldo et al. ............. | 704/4 |
| 6,885,985 | B2 | 4/2005 | Hull ............. | 704/2 |
| 6,990,439 | B2 | 1/2006 | Xun ............. | 704/2 |
| 2003/0061023 | A1 | 3/2003 | Menezes et al. ............. | 704/4 |
| 2004/0002848 | A1 | 1/2004 | Zhou ............. | 704/2 |
| 2004/0030551 | A1 | 2/2004 | Marcu et al. ............. | 704/240 |
| 2004/0044530 | A1 | 3/2004 | Moore ............. | 704/254 |
| 2004/0098247 | A1 | 5/2004 | Moore ............. | 704/4 |
| 2005/0267734 | A1 | 12/2005 | Masuyama ............. | 704/2 |
| 2007/0010989 | A1* | 1/2007 | Faruquie et al. ............. | 704/2 |

FOREIGN PATENT DOCUMENTS

WO WO 2005/093600 6/2005

OTHER PUBLICATIONS

Cyril Goutte, Kenji Yamada and Eric Gaussier. Aligning words using matrix factorisation. Xerox Research Centre Europe, 2004.*

(Continued)

*Primary Examiner*—Talivaldis I Smits
*Assistant Examiner*—Matthew H Baker
(74) *Attorney, Agent, or Firm*—Theodore M. Magee; Westman, Champlin & Kelly, P.A.

(57) ABSTRACT

A method is provided for identifying phrase alignment pairs between a source sentence and a target sentence. Boundaries for a phrase in the source sentence are identified by requiring that a source word be aligned with at least one target word in a target sentence in order to form a boundary for the source phrase. Boundaries for a phrase in the target sentence are identified based on alignments between words in the source phrase and words in the target sentence. The words in the target phrase are examined to determine if any of the words are aligned with source words outside of the source phrase. If they are not aligned with source words outside of the source phrase, the source phrase and target phrase are determined to form an alignment pair and are stored as a phrase alignment pair.

19 Claims, 7 Drawing Sheets

OTHER PUBLICATIONS

Michel Simard, Nicola Cancedda, Bruno Cavestro, Marc Dymetman, Eric Gaussier, Cyril Goutte, Kenji Yamada. Translating with non-contiguous phrases. Proceedings of Human Language Technology Conference and Conference on Empirical Methods in Natural Language Processing (HLT/EMNLP), pp. 755-762, Vancouver, Oct. 2005.*

Venugopal, Vogel, Waibel. Effective Phrase Translation Extraction from Alignment Models. Annual Meeting of the ACL archive Proceedings of the 41st Annual Meeting on Association for Computational Linguistics—vol. 1 table of contents Sapporo, Japan. pp. 319-326. Year of Publication: 2003.*

Written Opinion and Search Report from the Korean Patent Office in counterpart foreign application No. PCT/US2007/010668 filed Apr. 30, 2007.

Zhang et al., "An Efficient Phrase-to-Phrase Alignment Model Arbitrarily Long Phrase and Large Corpora," In: EAMT $10^{th}$ Annual Conference, May 30-31, 2005, Budapest, Hungary, pp. 294-301.

Zhang et al., "Integrated Phrase Segmentation and Alignment Algorithm for Statistical Machine Translation," In: Natural Language Processing and Knowledge Engineering, 2003, Proceedings, 2003 International conference Oct. 26-29, 2003, pp. 567-573.

Koehn et al., "Statistical Phrase-Based Translation," North American Chapter Of The Association For Computational Linguistics, Proceedings of the 2003 Conference of the North American Chapter of the Association for Computational Linguistics on Human Language Technology—vol. 1 table of contents, Edmonton, Canada, pp. 48-54, 2003.

Zhao et al., "A Generalized Alignment-Free Phrase Extraction," Proceedings of the ACL Workshop on Building and Using Parallel Texts, pp. 141-144, Ann Arbor, Jun. 2005.

Zhang et al., "Competitive Groups in Integrated Phrase Segmentation and Alignment Models," Proceedings of the ACT Workshop on Building and Using Parallel Texts, pp. 159-162, Ann Arbor, Jun. 2005.

Bannard et al., "Paraphrasing with Bilingual Parallel Corpora," In Proceedings of ACL-2005.

Och et al., "A Systematic Comparison of Various Statistical Alignment Models," Computational Linguistics, vol. 29, Issue 1, (Mar. 2003), pp. 19-51, 2003.

* cited by examiner

EFFICIENT PHRASE PAIR EXTRACTION FROM BILINGUAL WORD ALIGNMENTS

BACKGROUND

Translation models are used to translate a sentence in a source language into a sentence in a target language. For instance, translation models can be used to translate an English sentence into its French equivalent.

Translation models have been developed that rely on both one-to-many translations, known as word translations, and many-to-many translations, known as phrase translations. In one-to-many translations, one word in a source language is translated into one or more words in a target language. In many-to-many translations, multiple contiguous words in a source language are translated into multiple contiguous words in a target language.

In order to construct a translation model, a bilingual corpus, consisting of source sentences of a first language aligned with target sentences of a second language, is used to identify possible word translations and phrase translations. Word translations are typically identified using a statistical word aligner that identifies alignments between words in the source sentence and words in the target sentence based on a number of factors including the rate of co-occurrence of the source words and target words in aligned sentences of the bilingual corpus.

Phrase alignments have been extracted directly from sentence aligned bilingual corpora using similar statistical techniques. In other systems of the past, phrase alignments are extracted by first extracting word alignments and then using the word alignments to identify phrases. In such systems, a source phrase and a target phrase are said to be aligned when none of the words of the source phrase are aligned with a word in the target sentence that is outside of the target phrase and none of the words in the target phrase are aligned with words in the source sentence outside of the source phrase, and at least one word in the source phrase is aligned to a word in the target phrase.

A naive algorithm that independently compared each possible source phrase with each possible target phrase would have a complexity of at least $O(l^2m^2)$, where l and m are the lengths of the source and target sentences, respectively.

The discussion above is merely provided for general background information and is not intended to be used as an aid in determining the scope of the claimed subject matter.

SUMMARY

A method is provided for identifying phrase alignment pairs between a source sentence and a target sentence. Boundaries for a phrase in the source sentence are identified by requiring that a source word be aligned with at least one target word in a target sentence in order to form a boundary for the source phrase. Boundaries for a phrase in the target sentence are identified based on alignments between words in the source phrase and words in the target sentence. The words in the target phrase are examined to determine if any of the words are aligned with source words outside of the source phrase. If they are not aligned with source words outside of the source phrase, the source phrase and target phrase are determined to form an alignment pair and are stored as a phrase alignment pair.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
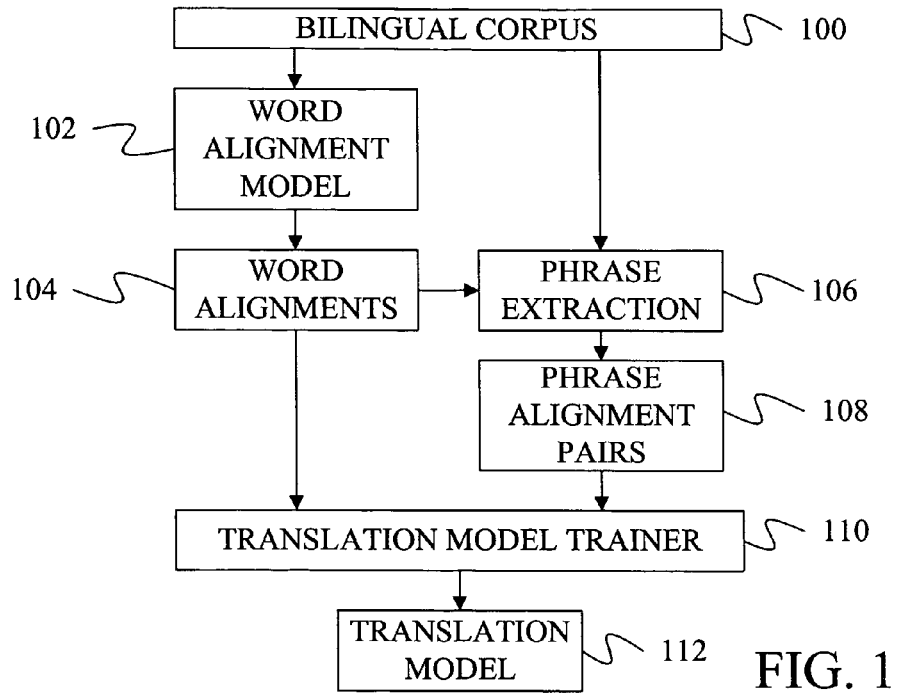
FIG. 1 is a block diagram of a system for training a translation model.

FIG. 1 is a general block diagram of a system for constructing a translation model that utilizes phrase alignments extracted from a bilingual corpus. In FIG. 1, a bilingual corpus 100 is provided to a word alignment model 102. Bilingual corpus 100 consists of source sentences in a first language that are aligned with target sentences in a second language. An example of such bilingual corpora is the Canadian Hansards Parliamentary Proceedings, which are aligned using known sentence-level alignment techniques such as the techniques described in U.S. Patent Publication 2004-0044530A1 to provide English-French bilingual sentence pairs.

Word alignment model 102 uses bilingual corpus 100 to identify word alignments 104. Word alignment model 102 can take the form of any statistical word alignment model that identifies one-to-many alignments between words in a source sentence and words in a target sentence. Examples of statistical word alignment models include the IBM Models 1-5, which are well known in the art.

In word alignments 104, each source word is identified as either being linked to no words in the target sentence, one word in the target sentence, or multiple contiguous words in the target sentence. Similarly, each target word in the target sentence is denoted as being aligned with no words in the source sentence, one word in the source sentence, or multiple contiguous words in the source sentence. Source words and target words that are aligned with at least one word are said to be linked. Source words and target words that are not aligned with a word are said to be unlinked.

Figure 2:
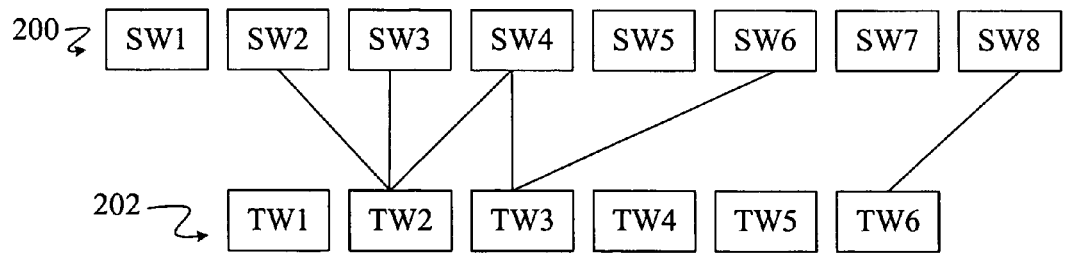
FIG. 2 is an example of word alignments between a source sentence aligned with a target sentence.

FIG. 2 provides a graphical example of word alignments for a source sentence 200 and a target sentence 202 that are aligned in the bilingual corpus. Source sentence 200 consists of source words SW1, SW2, SW3, SW4, SW5, SW6, SW7 and SW8. Target sentence 202 consists of target words TW1, TW2, TW3, TW4, TW5 and TW6. Alignments between words are shown as lines connecting a source word to a target word. In the word alignments of FIG. 2, target word TW2 is aligned with three source words SW2, SW3 and SW4, source word SW4 is aligned with two target words TW2 and TW3, target word TW3 is aligned with two source words SW4 and SW6, and target word TW6 is aligned with source word SW8.

Source words SW1, SW5 and SW7 and target words TW1, TW4 and TW5 are not aligned with any words and are considered unlinked.

Phrase extraction 106 uses word alignments 104 to identify phrase alignment pairs 108 in bilingual corpus 100. Each phrase alignment pair in phrase alignment pairs 108 consists of a source phrase, formed of a contiguous sequence of words in the source sentence, and a target phrase, formed of a contiguous sequence of words in the target sentence. The phrase pair represents a many-to-many relationship where no word in the source phrase is aligned with a word in the target sentence outside of the target phrase and no word in the target phrase is aligned with a word in the source sentence outside of the source phrase, and at least one word in the source phrase is aligned to a word in the target phrase. The source phrase and target phrase are defined by phrase boundaries, with the starting boundary being the first word in the phrase and the ending boundary being the last word in the phrase.

Using word alignments 104 and phrase alignment pairs 108, a translation model trainer 110 develops statistics for the occurrence of the aligned words and aligned phrases. These statistics are then used to construct a translation model 112, which provides the probability of target words and target phrases given source words and source phrases as well as the probability of source words and source phrases given target words and target phrases.

Figure 3:
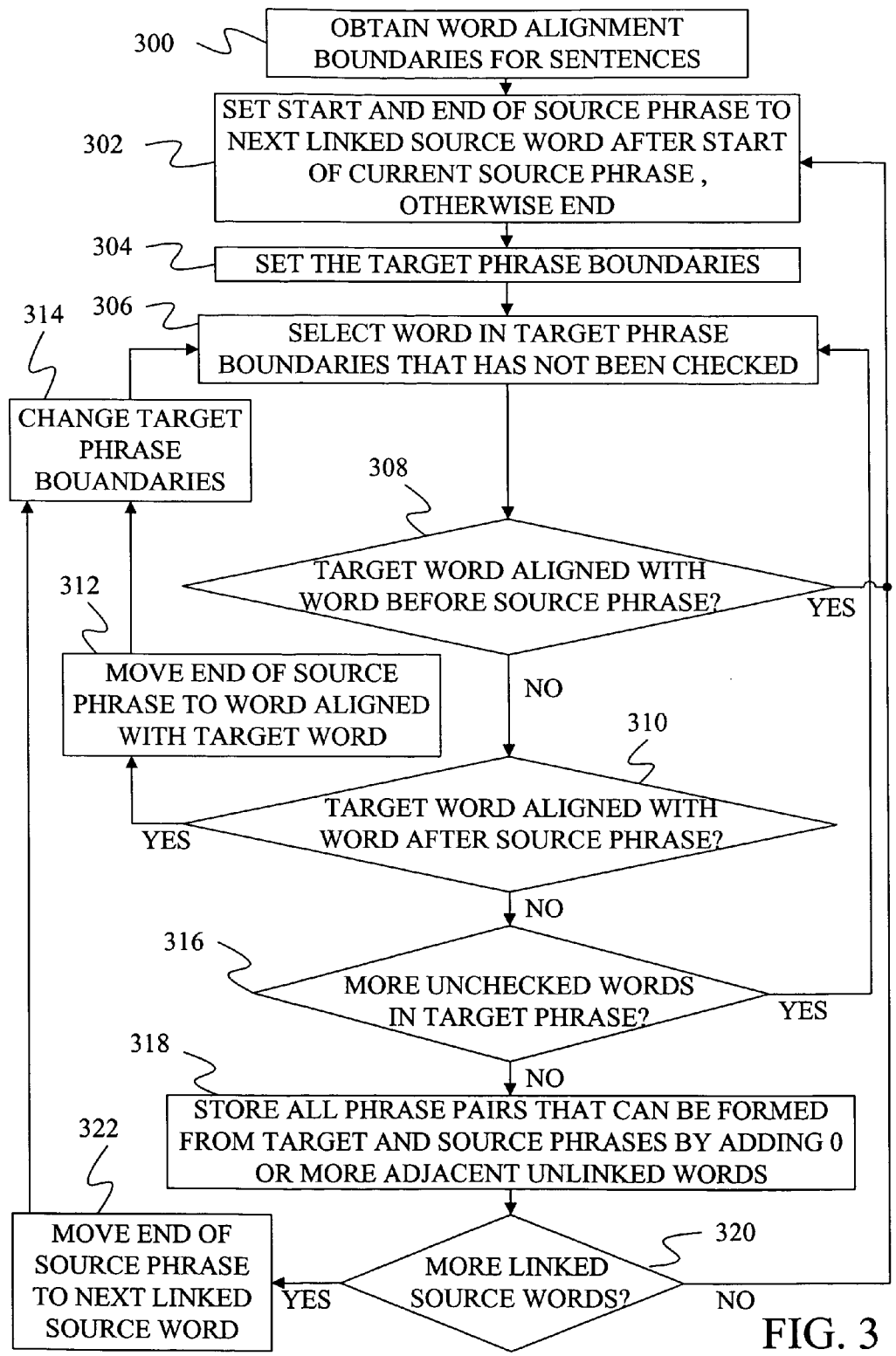
FIG. 3 is a flow diagram of a method of extracting aligned phrase pairs.

FIG. 3 provides a flow diagram of one method of phrase extraction under one embodiment. In step 300 of FIG. 3, word alignment boundaries for a target sentence and a source sentence are retrieved from word alignments 104. Under one embodiment, a word alignment for a source word provides the minimum word position and the maximum word position of the target words aligned with the source word. Similarly, the word alignment for a target word provides the minimum word position and the maximum word position of the source words aligned with the target word. Information regarding the alignment of a target word to a word between the minimum source word and the maximum source word or between a source word and the minimum target word and the maximum target word are not retrieved. For example, for the alignment of FIG. 2, the alignment information for target word TW3 would include SW4 as the minimum source word and SW6 as the maximum source word without reference to source word SW5. This simplifies the data structures required for storing the word alignments during the process of FIG. 3. In other embodiments, information regarding each alignment between the source words and the target words is retrieved at step 300.

At step 302, using the word alignments for the source words in a source sentence, and beginning at the start of the source sentence, the method finds the next source word that is aligned with at least one target word and sets the start and end of a possible source phrase to that word. Note that source words that are not aligned with target words are not considered to start a source phrase at step 302. For example, in the word alignments of FIG. 2, source word SW5 would be skipped during step 302.

Using the minimum target word position and maximum target word position associated with the source word selected at step 302, the phrase extraction process sets the boundaries of a target phrase at step 304. In particular, the beginning of the target phrase is set to the minimum target word position for the source word and the end of the target phrase is set to the maximum target word position for the source word. For example, in FIG. 2, if the start and end of the source phrase are positioned at source word SW4, the beginning of the target phrase would be set to TW2 and the end of the target phrase would be set to TW3.

At step 306, a word in the target phrase boundary that has not had its word alignments checked is selected. At step 308, the word alignments for the selected target word are examined to determine if the target word is aligned with a word in the source sentence that is before the current source phrase. If the target word is aligned with a word before the source phrase, the process returns to step 302 to find the next source word that is aligned with a target word by moving from the current source word toward the end of the source sentence. The start and end of a new source phrase is then set to the next source word. Steps 304, 306 and 308 are then performed for the new source phrase.

If the target word at step 308 is not aligned with a word before the source phrase, the process continues at step 310, where a determination is made as to whether the target word is aligned with a source word after the source phrase. If the target word is aligned with a word after the source phrase, the end of the source phrase is moved to the maximum source word position aligned with the target word at step 312.

The combination of steps 308 and 302 and the combination of steps 310 and 312 allow spans of source words to be excluded from consideration as forming part of a translation pair without having to identify corresponding target phrases for the span. This is done by first identifying a possible source phrase and the boundaries of a corresponding possible target phrase before reaching steps 308 and 310. In steps 308 and 310, a determination is made that the possible target phrase includes a target word linked to a source word that is exterior to the source phrase. In step 308, this involves determining that the exterior source word is before the source phrase and in step 310 this involves determining that the exterior word is after the source phrase.

The combination of steps 308 and 302 exclude spans of source words without having to identify corresponding target phrases by excluding spans of source words that share a boundary with the current source phrase (the start of the current source phrase), do not include the exterior source word, and include all of the words of the source phrase. For example, if the current source phrase is set to SW4-SW6 and the corresponding target phrase is set to TW2-TW3, steps 308 and 302 would identify source word SW2 as the exterior source word and would exclude spans of source words that begin with the start boundary, SW4, that do not include source word SW2, and that include all of the words of the current source phrase SW4-SW6. Thus, steps 308 and 302 exclude spans SW4-SW7, and SW4-SW8 without identifying corresponding target phrases for those spans. This can be seen from the fact that at step 302, the start of the current phrase is shifted directly to SW6 without performing any processing on spans SW4-SW7 and SW4-SW8.

The combination of steps 310 and 312 exclude spans of source words without having to identify corresponding target phrases by excluding spans of source words that share a boundary with the current source phrase (the start of the current source phrase), do not include the exterior source word, and include all of the words of the source phrase. For example, if the current source phrase is set to SW2-SW4 and the corresponding target phrase is set to TW2-TW3, steps 310 and 312 would identify source word SW6 as the exterior source word and would exclude spans of source words that begin with the start boundary, SW2, that do not include source word SW6, and that include all of the words of the current source phrase SW2-SW4. Thus, steps 310 and 312 exclude span SW2-SW5 without identifying corresponding target phrases for that span. This can be seen from the fact that at step 312, the end of the current phrase is shifted directly to SW6 without performing any processing on span SW2-SW5.

After the end of the source phrase has been moved at step 312, the target phrase boundaries are changed based on the movement of the end of the source phrase at step 314.

Figure 4:
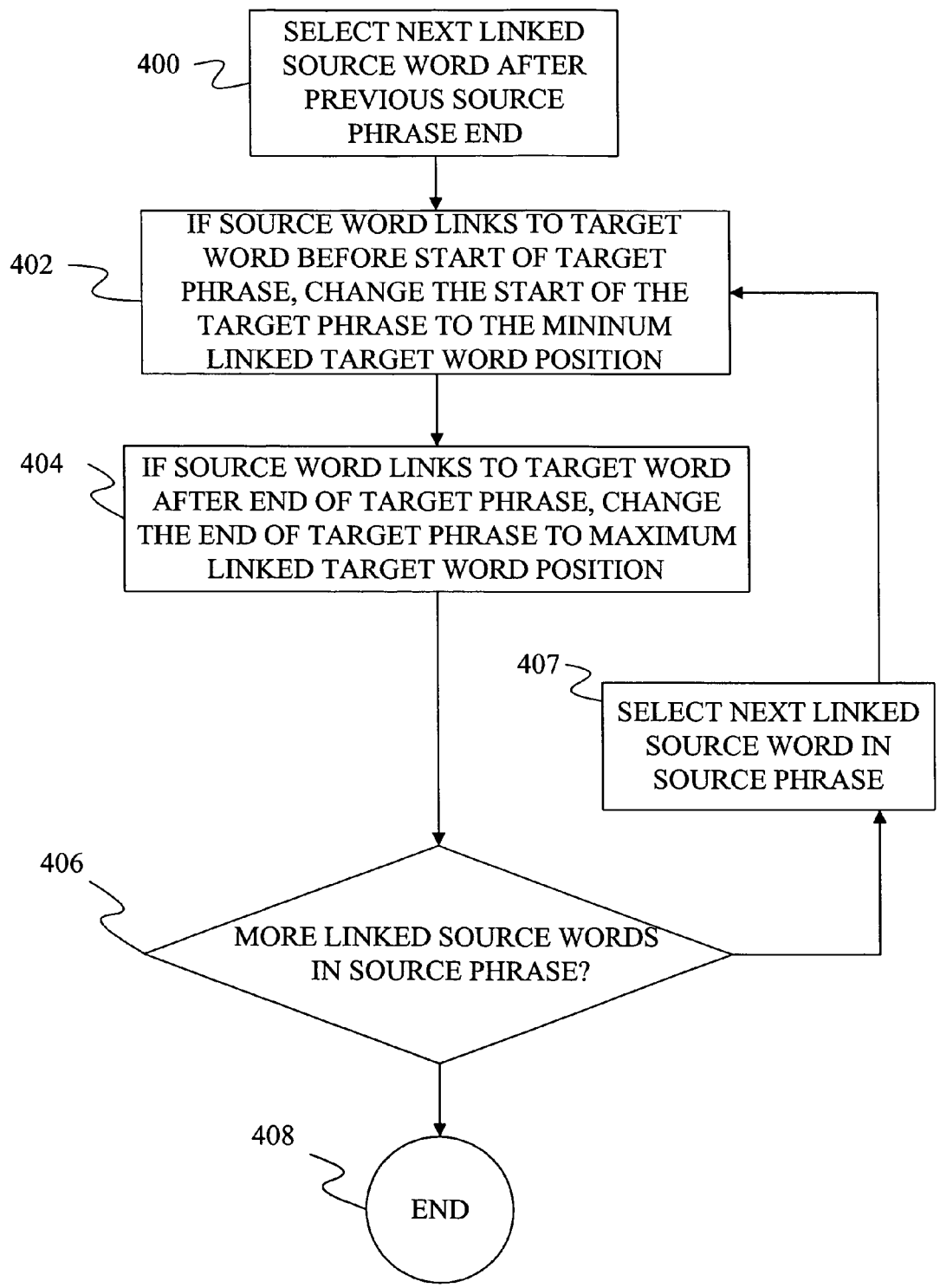
FIG. 4 is a flow diagram for expanding target phrase boundaries based on a change in the end of a source phrase boundary.

FIG. 4 provides a flow diagram of the steps performed in step 314 of FIG. 3. In step 400, the next linked source word after the previous source phrase end is selected. For example, in FIG. 2, if the previous source phrase started and ended at word SW2, step 400 would select source word SW3. At step 402, if the source word links to a target word that is before the start of the current target phrase, the start of the target phrase is changed to the minimum linked target word position for the source word. At step 404, if the source word links to a target word after the end of the target phrase, the end of the target phrase is changed to the maximum linked target word position for the source word. For example, if at step 400, source word SW4 is selected when the target phrase starts and ends at target word TW2, step 404 would cause the end of the target phrase to be moved to target word TW3, since this is the maximum linked target word position for source word SW4.

At step 406, the process of FIG. 4 determines if there are more linked source words in the source phrase that have not been checked. If there are more linked source words, the next linked source word is selected at step 407 and steps 402, 404 and 406 are repeated. When there are no more linked source words in the source phrase at step 406, the process ends at step 408.

Returning to FIG. 3, after step 314 in which the target phrase boundaries have been changed based on a change in the end of the source phrase boundary, the process returns to step 306 to select the next word in the target phrase boundaries that has not been checked. Steps 308 and 310 are then performed for the newly selected target word.

When the selected target word is not aligned with a word before the source phrase or after the source phrase as determined in steps 308 and 310, the process determines if there are more unchecked words in the target phrase at step 316. If there are more unchecked target words, the next unchecked target word in the target phrase is selected at step 306 and steps 308 and 310 are performed for the newly selected target word.

When there are no more unchecked target words in the target phrase at step 316, the process continues at step 318, where all source phrases and target phrases that can be formed from the current source phrase and the current target phrase, by adding 0 or more adjacent unlinked words, are stored as phrase alignment pairs. The process for storing such phrase alignment pairs is shown in more detail in the flow diagram of FIG. 5.

Figure 5:
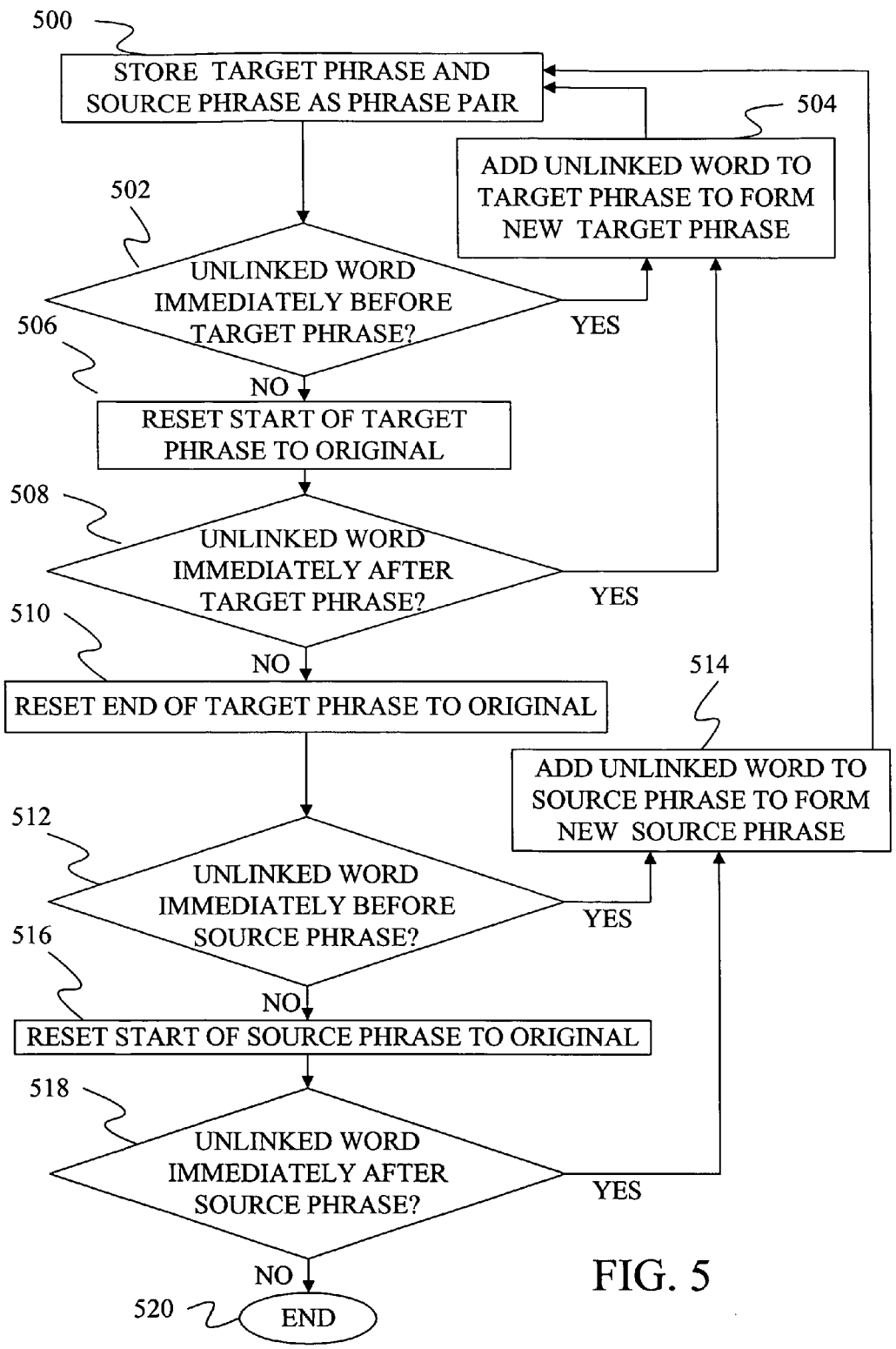
FIG. 5 is a flow diagram for identifying additional phrase pairs that can be formed by adding unlinked words to target and source phrases.

The flow diagram of FIG. 5 is described below with reference to the aligned bilingual sentences of FIG. 2. In particular, the flow diagram is discussed above using the example of entering the process of FIG. 5 with the current source phrase being SW2-SW6 and the current target phrase being TW2-TW3.

In step 500 of FIG. 5, the current source phrase and current target phrase as identified before entering step 318 of FIG. 3, are stored as a phrase alignment pair in phrase alignment pairs 108. For the example from FIG. 2, source phrase SW2-SW6 and target phrase TW2-TW3 would be stored as a phrase alignment pair at step 500. Note that none of the source words in the source phrase are aligned with target words outside of the target phrase and none of the target words in the target phrase are aligned with source words outside of the source phrase.

At step 502, the process determines if there is an unlinked word immediately before the target phrase. If there is an unlinked word immediately before the target phrase, the unlinked word is added to the target phrase to form a new target phrase at step 504. For the example of FIG. 2, this would involve adding target word TW1 to the target phrase to form a new target phrase consisting of words TW1-TW3. The process then returns to step 500 to store the new target phrase and the source phrase as a phrase alignment pair. For the example of FIG. 2, this involves storing the target phrase consisting of words TW1-TW3 with the source phrase consisting of source words SW2-SW6.

The process then returns to step 502 to determine if there are more unlinked words immediately before the target phrase. When there are no further unlinked words immediately before the target phrase, the process continues at step 506 where the start of the target phrase is reset to the original start of the target phrase. In the example of FIG. 2, this involves resetting the start of the target phrase to target word TW2.

After the start of the target phrase has been reset, the process continues at step 508, where it determines if there is an unlinked word immediately after the target phrase. If there is an unlinked word immediately after the target phrase, this unlinked word is added to the target phrase at step 504 and the new target phrase and source phrase are stored as a phrase alignment pair. In the example of FIG. 2, this involves adding target word TW4 to the target phrase to form a target phrase consisting of words TW2-TW4. This target phrase is then stored with the source phrase consisting of words SW2-SW6 at step 500.

The process then returns to step 502 to determine if there is any unlinked words immediately before the target phrase. In the example of FIG. 2, TW1 is an unlinked word that is immediately before the target phrase. As such, at step 504, the unlinked word is added to the target phrase to form a new target phrase consisting of target words TW1-TW4. This new target phrase is then stored with the source phrase SW2-SW6 as a phrase alignment pair at step 500.

The process returns to step 502 and determines that there are no further unlinked words immediately before the start of the target phrase. As such, the start of the target phrase is reset to the original start of the target phrase at step 506 and the process determines if there are any unlinked words after the target phrase at step 508. In the example of FIG. 2, there is an unlinked word, TW5, immediately after the current target phrase. As such, the process returns to step 504 to add TW5 to the target phrase and the target phrase TW2-TW5 and the source phrase SW2-SW6 are stored as a phrase alignment pair.

The process then returns to step 502 to determine if there is any unlinked words immediately before the target phrase. In the example of FIG. 2, TW1 is an unlinked word that is immediately before the target phrase. As such, at step 504, the unlinked word is added to the target phrase to form a new target phrase consisting of target words TW1-TW5. This new target phrase is then stored with the source phrase SW2-SW6 as a phrase alignment pair at step 500.

The process returns to step 502 and determines that there are no further unlinked words immediately before the start of the target phrase. As such, the start of the target phrase is reset to the original start of the target phrase at step 506 and the process determines if there are any unlinked words immediately after the target phrase at step 508. Since the next word after the current target phrase is TW6, which is linked to source word SW8, there are no more unlinked words immediately after the target phrase at step 508. As such, the process continues at step 510 where the end of the target phrase is reset to its original position at target word TW3.

At step 512, the process determines if there are any unlinked words immediately before the source phrase. In the example of FIG. 2, source word SW1 is unlinked and as such is added to the source phrase at step 514 to form a new source phrase SW1-SW6. The process then returns to step 500 to add the new source phrase SW1-SW6 and the original target phrase TW2-TW3 as a phrase alignment pair.

Steps 502 and 504 are then performed to add an unlinked word that comes immediately before the target phrase to the target phrase resulting in a new target phrase consisting of target words TW1-TW3. The new target phrase TW1-TW3 is then stored with the source phrase SW1-SW6 as a phrase alignment pair. Note that although an unlinked word has been added to both the source phrase and the target phrase, none of the words in the source phrase are aligned with target words outside of the target phrase and none of the words of the target phrase are aligned with source words outside of the source phrase.

Steps 506, 508, 504 and 500 are then preformed to add the target phrase TW2-TW4 and the source phrase SW1-SW6 as a phrase alignment pair. Steps 502, 504 and 500 are then performed to add the target phrase TW1-TW4 and the source phrase SW1-SW6 as a phrase alignment pair. Steps 506, 508, 504 and 500 are then preformed to add the target phrase TW2-TW5 and the source phrase SW1-SW6 as a phrase alignment pair. Steps 502, 504 and 500 are then performed to add the target phrase TW1-TW5 and the source phrase SW1-SW6 as a phrase alignment pair.

The end of the target phrase is then reset at step 510 and the process continues at step 512 to determine if there is an unlinked word immediately before the current source phrase. Since there are no more unlinked words immediately before the source phrase, the start of the source phrase is reset to the original source phrase start at step 516. Thus the source phrase start is reset to SW2 in the example of FIG. 2.

At step 518, the process determines if there are any unlinked words immediately after the source phrase. If there are any unlinked words, the process returns to step 514 to add the unlinked word, such as unlinked source word SW7 to form a new source phrase SW2-SW7. This new source phrase is then stored with the original target phrase at step 500 forming a phrase alignment pair consisting of source phrase SW2-SW7 and target phrase TW2-TW3. All possible target phrases that can be formed by adding adjacent unlinked target words are then formed using the steps 500, 502, 504, 506 and 508 as described above. Each target phrase that is formed is stored with the current form of the source phrase as a phrase alignment pair.

In addition, all source phrases that can be formed with the current end of the source phrase by adding adjacent unlinked source words to the beginning of the source phrase are formed using steps 512 and 514. For each of these source phrases, every possible target phrase that can be formed by adding adjacent unlinked words is formed and the target phrase and the source phrase are added as alignment pairs.

When there are no further unlinked words after the source phrase at step 518, the process ends at step 520. Through the process of FIG. 5 the following source phrase and target phrase alignment pairs would be identified:

SW2-SW6/TW2-TW3
SW2-SW6/TW1-TW3
SW2-SW6/TW2-TW4
SW2-SW6/TW1-TW4
SW2-SW6/TW2-TW5
SW2-SW6/TW1-TW5
SW1-SW6/TW2-TW3
SW1-SW6/TW1-TW3
SW1-SW6/TW2-TW4
SW1-SW6/TW1-TW4
SW1-SW6/TW2-TW5
SW1-SW6/TW1-TW5
SW2-SW7/TW2-TW3
SW2-SW7/TW1-TW3
SW2-SW7/TW2-TW4
SW2-SW7/TW1-TW4
SW2-SW7/TW2-TW5
SW2-SW7/TW1-TW5
SW1-SW7/TW2-TW3
SW1-SW7/TW1-TW3
SW1-SW7/TW2-TW4
SW1-SW7/TW1-TW4
SW1-SW7/TW2-TW5
SW1-SW7/TW1-TW5

Returning to FIG. 3, after the phrase pairs have been formed from the target and source phrases by adding adjacent unlinked words at step 318, the process continues at step 320 where the method determines if there are more linked source words after the end of the current source phrase. If there are more linked source words after the current source phrase, the end of the source phrase is moved to the next linked source word after the current source phrase at step 322. For example, if the end of the current source phrase is source word SW6 in FIG. 2, then step 322 would involve moving the end of the source phrase to source word SW8.

After step 322, the process returns to step 314 and changes the target phrase boundaries based on the new end for the source phrase. For example, in FIG. 2, the end of the target phrase boundary would be changed from TW4 to TW6 due to the change in the end of the source phrase from source word SW6 to SW8. The process then continues at step 306, where a target word in the target phrase boundaries that has not been checked yet is selected. In the example given above, this would be target word TW5. Steps 308, 310, 316, 312 and 318 are then performed for the new source and target phrase boundaries.

If there are no more linked source words after the current source phrase at step 320, the process returns to step 302 where the start and end of the source phrase is reset to the next linked source word after the start of the current source phrase. If there are no other linked source words after the start of the current source phrase, the process ends at step 302 and all source phrases have been formed. For example, in FIG. 2, if the current source phrase were SW4-SW8, step 302 would involve setting the start and end of the source phrase to source word SW6. Also, if the current source phrase were SW8, the process would end when returning to step 302, since there are no further linked source words after source word SW8.

The process of FIG. 3 provides an efficient means for extracting phrase pairs from a bilingual corpus based on word alignment. In particular, efficiencies are realized by initially only considering source and target phrases that begin and end with linked words. Once such phrases have been identified, adjacent unlinked words can then be added to the core source and target phrases to form additional source and target phrases easily. In addition, as discussed above, steps 308, 302, 310 and 312 allow spans of source words to be excluded from consideration as forming part of an alignment pair without identifying possible target phrases for the spans.

In some embodiments, additional limitations are placed on the phrase pairs extracted through the process of FIG. 3. In particular, under some embodiments, the number of words in the target and/or source phrase is limited. Also, the number of adjacent unlinked words that are added to a core source or target phrase is limited under some embodiments.

Figure 6:
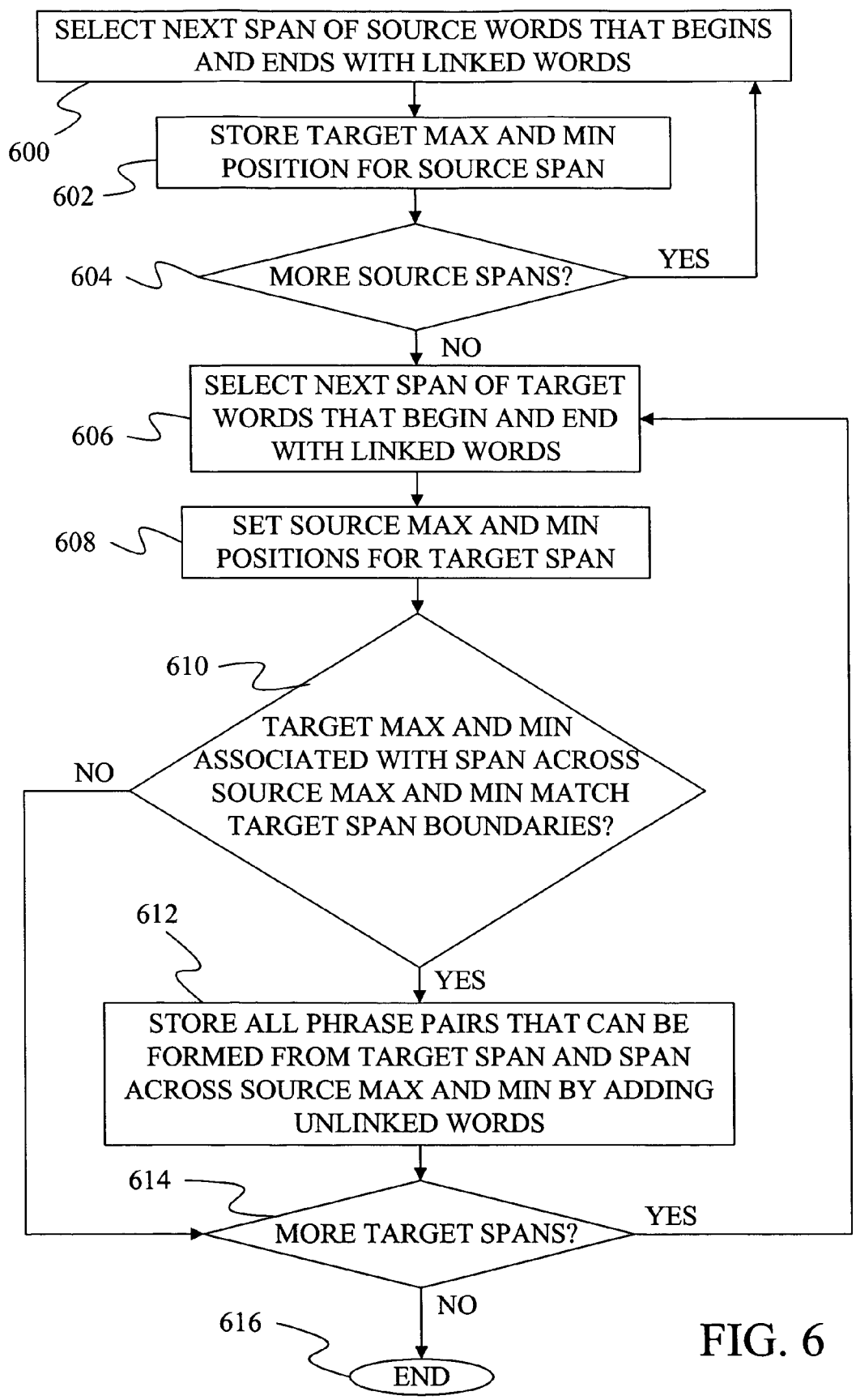
FIG. 6 is a flow diagram of an alternative method for identifying aligned phrase pairs.

FIG. 6 provides an alternative method for identifying phrase pairs in phrase extraction 106. At step 600 of FIG. 6, a span of source words that begins and ends with linked words is selected. Each target word linked to a word in the span of source words is determined to determine the maximum and minimum positions of target words linked to any of the words in the source span. These maximum and minimum target positions are stored at step 602 for the source span. At step 604, the method determines if there are more source spans that being and end with linked source words. If there are more source spans, the process returns to step 600 and selects the next span of source words. Steps 600, 602 and 604 are repeated until there are no more spans of source words that begin and end with linked words.

When there are no more source spans, the process continues at step 606 where a span of target words that begins and ends with linked words is selected. The alignments between each target word in the span of target words are examined to identify the maximum and minimum position in the source sentence linked to any of the target words in the target span at step 608.

At step 610, the target span boundaries determined in step 606 are compared to the target maximum and minimum positions associated with the span defined by the source maximum and minimum determined in step 608. Using the example of FIG. 2, if the current target span selected in step 606 is TW3-TW6, the source maximum and minimum span associated with that target span is SW4-SW8. In turn, this source span has a target maximum and minimum of TW2-TW6. Thus, in step 610, the target span boundaries TW3-TW6 are compared to the target maximum and minimum values of TW2-TW6 and it is determined that the spans do not match. As a second example, if the target span boundaries selected in step 606 are TW2-TW3, the corresponding source maximum and minimum determined in step 608 would be SW2-SW6. The target maximum and minimum associated with that source span would be TW2-TW3, which match the target span boundaries for the target span selected at step 606. As such, at step 610, the target maximum and minimum would match the target span boundaries.

If the target maximum and minimum match the target span boundaries at step 610, all of the phrase pairs that can be formed from the target span and the span across the source maximum and minimum by adding adjacent unlinked words are stored as phrase alignment pairs at step 612. The process for generating such phrase alignment pairs is shown in FIG. 5 as discussed above in connection with step 318 of FIG. 3.

After the phrase alignment pairs have been stored or if the target maximum and minimum do not match the target span boundaries at step 610, the process determines if there are more target spans at step 614. If there are more target spans, the process returns to step 606 to select the next span of target words that begin and end with linked words. If there are no more target spans that begin and end with linked words at step 614, the process ends at step 616.

Figure 7:
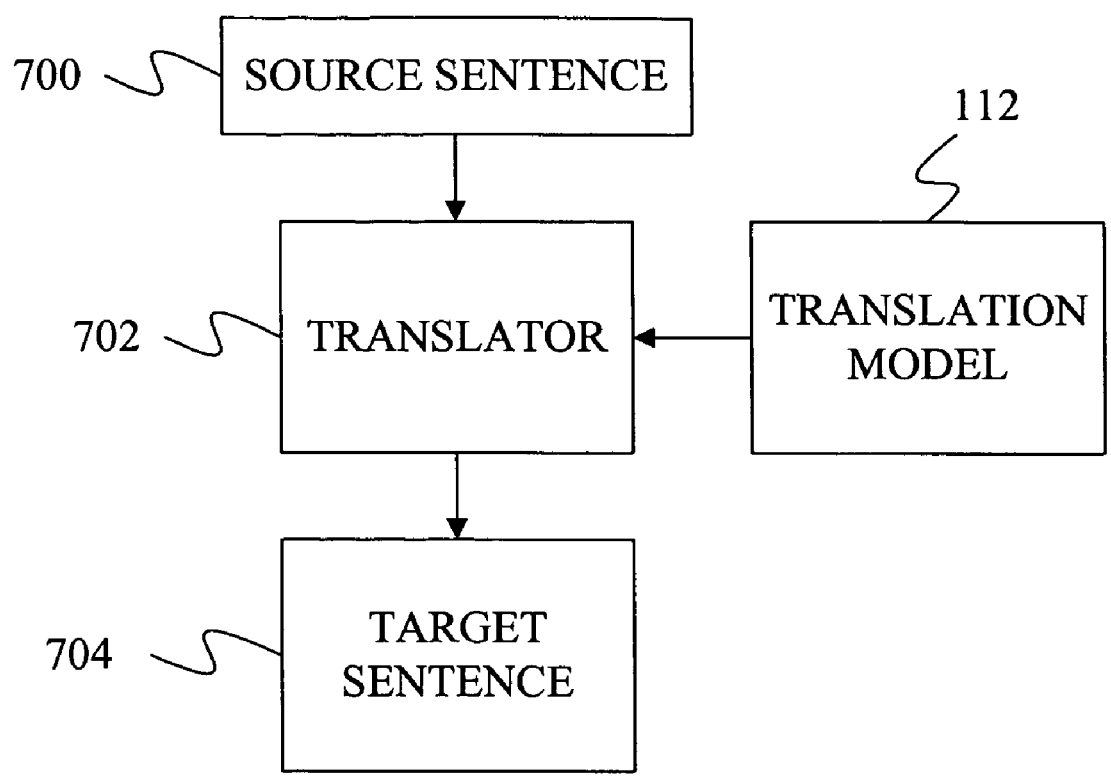
FIG. 7 is a block diagram of a translation system.

FIG. 7 provides a block diagram of a translation system in which translation model 112 of FIG. 1 may be used. In FIG. 7, a source sentence 700 is provided to a translator 702, which uses translation model 112 to determine possible translations for individual words and phrases in source sentence 700 to produce a target sentence 704.

Figure 8:
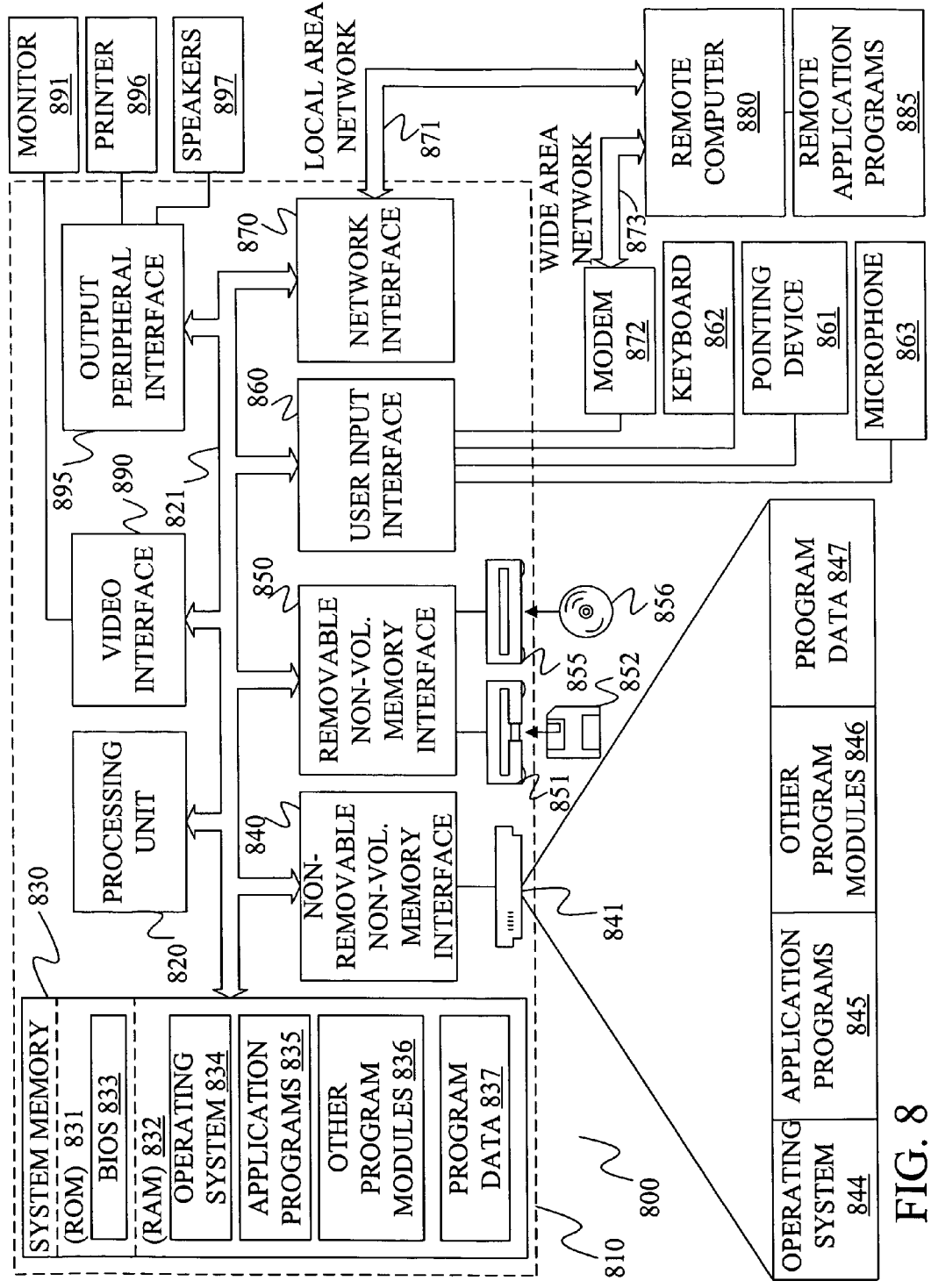
FIG. 8 is a block diagram of a general computing environment in which the embodiments may be practiced.

FIG. 8 illustrates an example of a suitable computing system environment 800 on which embodiments may be implemented. The computing system environment 800 is only one example of a suitable computing environment and is not intended to suggest any limitation as to the scope of use or functionality of the claimed subject matter. Neither should the computing environment 800 be interpreted as having any dependency or requirement relating to any one or combination of components illustrated in the exemplary operating environment 800.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 8, an exemplary system for implementing some embodiments includes a general-purpose computing device in the form of a computer 810. Components of computer 810 may include, but are not limited to, a processing unit 820, a system memory 830, and a system bus 821 that couples various system components including the system memory to the processing unit 820. The system bus 821 may be any of several types of bus structures.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable volatile/nonvolatile computer storage media. By way of example only, FIG. 8 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. These and other input devices are often connected to the processing unit 820 through a user input interface 860 that is coupled to the system bus, but may be connected by other interface and bus structures, such as a parallel port, game port or a universal serial bus (USB). A monitor 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 8 include a local area network (LAN) 871 and a wide area network (WAN) 873, but may also include other networks.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 8 illustrates remote application programs 885 as residing on remote computer 880.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   identifying boundaries for a phrase in a source sentence by requiring that a source word be aligned with at least one target word in a target sentence in order to form a boundary of a source phrase;
   identifying boundaries for a phrase in the target sentence based on alignments between words in the source phrase and words in the target sentence;
   determining if the source phrase and target phrase form a phrase alignment pair by determining if any of the words of the target phrase are aligned with source words outside of the source phrase;
   if a target word in the target phrase is aligned with a source word outside of the source phrase, a processor excluding a contiguous span of source words as a possible source phrase for phrase alignment pairs without identifying boundaries for a target phrase corresponding to the contiguous span if the contiguous span shares a common boundary with the source phrase, does not include the source word that is outside of the source phrase, and includes all of the words of the source phrase; and
   storing the source phrase and the target phrase if they form a phrase alignment pair.

2. The method of claim 1 further comprising:
   shifting at least one boundary of the source phrase to include an additional source word that is not aligned with any word of the target sentence to form an expanded source phrase; and
   storing the expanded source phrase and the target phrase as a second phrase alignment pair.

3. The method of claim 2 further comprising:
   shifting at least one boundary of the target phrase to include an additional target word that is not aligned with any word of the source sentence to form an expanded target phrase; and
   storing the expanded source phrase and the expanded target phrase as a third phrase alignment pair.

4. The method of claim 1 wherein identifying boundaries for a phrase in the target sentence based on alignments between words in the source phrase and words in the target sentence comprises:
   using a set of alignments for each source word, wherein each set of alignments comprises only the minimum target word position and the maximum target word position aligned with the source word.

5. The method of claim 1 wherein excluding a contiguous span of source words comprises:
   shifting an ending boundary of the source phrase directly to the source word that was outside of the source phrase to form a new source phrase.

6. The method of claim 1 wherein excluding a contiguous span of source words comprises:
shifting a starting boundary of the source phrase toward the ending boundary of the source phrase to a source word aligned with at least one target word to form a new source phrase.

7. A method comprising:
setting boundaries of a possible source phrase for a source sentence;
using word alignments between words in the possible source phrase and words in a target sentence to set boundaries for a possible target phrase in the target sentence;
a processor determining that a target word in the possible target phrase is aligned with an exterior source word of the source sentence that is not in the possible source phrase; and
a processor excluding from consideration as possible source phrases for phrase alignment pairs without identifying corresponding possible target phrases, spans of contiguous source words in the source sentence that share a boundary with the possible source phrase, do not include the exterior source word, and include all of the words of the possible source phrase.

8. The method of claim 7 wherein excluding a span of contiguous source words from consideration as a possible source phrase comprises shifting an ending boundary of the source phrase directly to the exterior source word to form a new possible source phrase.

9. The method of claim 8 further comprising:
using word alignments between source words and words in the target sentence for only those source words located after the ending boundary of the possible source phrase up to and including the exterior source word to set boundaries for a new possible target phrase in the target sentence.

10. The method of claim 9 further comprising:
determining that none of the target words in the new possible target phrase are aligned with a source word outside of the new possible source phrase; and
storing the new possible source phrase and the new possible target phrase as a phrase alignment pair.

11. The method of claim 7 wherein excluding a span of contiguous source words from consideration as a possible source phrase comprises shifting a starting boundary of the possible source phrase toward the ending boundary of the source phrase.

12. The method of claim 7 wherein setting boundaries for a possible source phrase for a sentence comprises using a requirement that the source words at the boundaries be aligned with at least one target word in the target sentence.

13. The method of claim 12 further comprising:
setting boundaries of a new possible source phrase for a source sentence;
using word alignments between words in the new possible source phrase and words in a target sentence to set boundaries for a new possible target phrase in the target sentence;
determining that none of the target words in the new possible target phrase are aligned with a source word outside of the new possible source phrase; and
storing the new possible source phrase and the new possible target phrase as a phrase alignment pair.

14. The method of claim 13 further comprising:
shifting a boundary of the new possible source phrase to a source word that is not aligned with any word of the target sentence to form an expanded source phrase; and storing the expanded source phrase and the new possible target phrase as a phrase alignment pair.

15. The method of claim 14 further comprising:
shifting a boundary of the new possible target phrase to a target word that is not aligned with any word of the source sentence to form an expanded target phrase; and
storing the expanded source phrase and the expanded target phrase as a phrase alignment pair.

16. A method comprising:
for each of a set of spans of contiguous words in a source sentence, determining a minimum word position and a maximum word position in a target sentence for target words aligned with the source words in the span of contiguous words in the source sentence;
for each of a set of spans of contiguous words in the target sentence, determining a minimum word position and a maximum word position in the source sentence for source words aligned with the target words in the span of contiguous words in the target sentence;
a processor designating a span of contiguous words in the source sentence and a span of contiguous words in the target sentence as a phrase alignment pair if the minimum word position and maximum word position in the target sentence respectively match a beginning and an ending of the span of contiguous words in the target sentence and if the minimum word position and maximum word position in the source sentence respectively match a beginning and an ending of the span of contiguous words in the source sentence.

17. The method of claim 16 further comprising determining if the minimum word position and maximum word position in the target sentence respectively match a beginning and an ending of the span of contiguous words in the target sentence and if the minimum word position and maximum word position in the source sentence respectively match a beginning and an ending of the span of contiguous words in the source sentence through steps comprising:
comparing the minimum word position in the target sentence for the span defined by the minimum word position and maximum word position in the source sentence to the beginning of the span of contiguous words in the target sentence; and
comparing the maximum word position in the target sentence for the span defined by the minimum word position and maximum word position in the source sentence to the ending of the span of contiguous words in the target sentence.

18. The method of claim 16 further comprising defining the set of spans of contiguous words in the source sentence by requiring that each span in the set begin with a source word that is aligned with at least one target word and end with a source word that is aligned with at least one target word.

19. The method of claim 18 further comprising, after designating the span of contiguous words in the source sentence and the span of contiguous words in the target sentence as a phrase alignment pair, shifting the beginning of the span of contiguous words in the source sentence so that the span of contiguous words in the source sentence covers more words and begins with a word that is not aligned with a word in the target sentence to form an expanded span of contiguous words in the source sentence and designating the expanded span of contiguous words in the source sentence and the span of contiguous words in the target sentence as a phrase alignment pair.

* * * * *